United States Patent
Bishop et al.

(10) Patent No.: US 10,607,153 B2
(45) Date of Patent: Mar. 31, 2020

(54) LAT BASED ANSWER GENERATION USING ANCHOR ENTITIES AND PROXIMITY

(71) Applicant: International Business Machines Corporation, Armonk, NY (US)

(72) Inventors: Timothy A. Bishop, Minneapolis, MN (US); Stephen A. Boxwell, Columbus, OH (US); Benjamin L. Brumfield, Cedar Park, TX (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 15/194,758

(22) Filed: Jun. 28, 2016

(65) Prior Publication Data
US 2017/0372190 A1    Dec. 28, 2017

(51) Int. Cl.
*G06N 20/00* (2019.01)
*G06F 17/27* (2006.01)
*G06N 5/02* (2006.01)
*G06F 16/00* (2019.01)

(52) U.S. Cl.
CPC ............. *G06N 20/00* (2019.01); *G06F 16/00* (2019.01); *G06F 17/277* (2013.01); *G06F 17/278* (2013.01); *G06N 5/022* (2013.01)

(58) Field of Classification Search
CPC ........ G06N 3/006; G06N 20/00; G06N 7/005; G06F 17/277; G06F 17/278
See application file for complete search history.

(56) References Cited

U.S. PATENT DOCUMENTS

| | | | |
|---|---|---|---|
| 8,275,803 B2 | 9/2012 | Brown et al. | |
| 8,396,884 B2 | 3/2013 | Singh et al. | |
| 8,510,296 B2 | 8/2013 | Fan et al. | |
| 8,666,730 B2 | 3/2014 | Todhunter et al. | |
| 9,110,944 B2 | 8/2015 | Brown et al. | |
| 9,317,586 B2 | 4/2016 | Chu-Carroll et al. | |
| 9,760,564 B2 | 9/2017 | Byron et al. | |

(Continued)

OTHER PUBLICATIONS

Dhillon et al, Co-Clustering Documents and Words Using Bipartite Spectral Graph Partitioning, 2001, ACM (Year: 2001).*

(Continued)

*Primary Examiner* — Austin Hicks
(74) *Attorney, Agent, or Firm* — Stephen J. Walder, Jr.; William J. Stock

(57) ABSTRACT

Mechanisms are provided for implementing a proximity based candidate answer pre-processor engine that outputs a sub-set of candidate answers to a question and answer (QA) system. The mechanisms receive a lexical answer type (LAT) and an entity specified in an input natural language question as well as an ontology data structure representing a corpus of natural language content. The mechanisms identify a set of candidate answers having associated nodes in the ontology data structure that are within a predetermined proximity of a node corresponding to the entity, and a sub-set of candidate answers in the set of candidate answers having an entity type corresponding to the LAT. The mechanisms output, to the QA system, the sub-set of candidate answers as candidate answers to the input natural language question for evaluation and selection of a final answer to the input natural language question.

18 Claims, 4 Drawing Sheets

(56) References Cited

U.S. PATENT DOCUMENTS

| | | | |
|---|---|---|---|
| 2001/0029505 A1* | 10/2001 | Gaudette | G11B 27/034 |
| 2009/0287678 A1 | 11/2009 | Brown et al. | |
| 2011/0066587 A1 | 3/2011 | Ferrucci et al. | |
| 2011/0125734 A1 | 5/2011 | Duboue et al. | |
| 2013/0007055 A1 | 1/2013 | Brown et al. | |
| 2013/0018652 A1 | 1/2013 | Ferrucci et al. | |
| 2013/0066886 A1 | 3/2013 | Bagchi et al. | |
| 2014/0006012 A1 | 1/2014 | Zhou et al. | |
| 2014/0358922 A1* | 12/2014 | Alkov | G06N 5/041 |
| | | | 707/737 |
| 2015/0193682 A1 | 7/2015 | Baughman et al. | |
| 2017/0084197 A1* | 3/2017 | Crouse | G09B 19/025 |

OTHER PUBLICATIONS

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

LAT BASED ANSWER GENERATION USING ANCHOR ENTITIES AND PROXIMITY

BACKGROUND

The present application relates generally to an improved data processing apparatus and method and more specifically to mechanisms for performing lexical answer type (LAT) based answer generation using anchor entities and proximity evaluations.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Current cognitive systems, such as QA systems, natural language search engines, and the like, have drawbacks in the way in which they process natural language input which results in a large expenditure of time and resources to process the natural language input to generate a result. Thus, there is a need to provide advanced processing capabilities in cognitive systems to reduce the amount of time and resources used to process such natural language input and generate an accurate result.

SUMMARY

In one illustrative embodiment, a method is provided, in a data processing system comprising at least one processor and at least one memory, wherein the at least one memory comprises instructions that are executed by the at least one processor to configure the data processing system to implement a proximity based candidate answer pre-processor engine that outputs a sub-set of candidate answers to a question and answer (QA) system. The method comprises receiving, by the proximity based candidate answer pre-processor engine of the data processing system, a lexical answer type (LAT) and an entity specified in an input natural language question. The method also comprises receiving, by the proximity based candidate answer pre-processor engine, an ontology data structure representing a corpus of natural language content. In addition, the method comprises identifying, by the proximity based candidate answer pre-processor engine, a set of candidate answers having associated nodes in the ontology data structure that are within a predetermined proximity of a node corresponding to the entity. Furthermore, the method comprises identifying, by the proximity based candidate answer pre-processor engine, a sub-set of candidate answers in the set of candidate answers having an entity type corresponding to the LAT. Moreover, the method comprises outputting, by the proximity based candidate answer pre-processor engine, to the QA system, the sub-set of candidate answers as candidate answers to the input natural language question for evaluation and selection of a final answer to the input natural language question. As a result, the illustrative embodiment reduces the time and resources required to evaluate an input question by focusing candidate answer evaluation to a sub-set of candidate answers that have nodes in an ontology that are within a proximity of a node corresponding to an entity in the input question, which is indicative of a close relationship with the entity in the input question.

In some illustrative embodiments, the input natural language question comprises a plurality of entities and the entity specified in the input natural language question is part of a sub-set of anchor entities in the plurality of entities. Anchor entities are entities having an entity type that has been previously identified to provide accurate results in generating candidate answers for input natural language questions. Such mechanisms provide improved accuracy by utilizing entities found to provide good results when processing input questions or other natural language text.

In some illustrative embodiments, the entity types associated with anchor entities are specified in a configuration data structure of the proximity based candidate answer pre-processor engine, and the entity types of anchor entities are specified either manually by a user or are automatically identified based on a machine learning process. In this way, the mechanisms of the illustrative embodiments are configured to implement anchor entities that have been previously identified by a user to generate accurate results for answering input questions or processing natural language text or which have been previously identified by an automated mechanism as generating accurate results.

In some illustrative embodiments, the entity types associated with anchor entities are specified in a configuration data structure of the proximity based candidate answer pre-processor engine, and the method further comprises: (1) performing, by the proximity based candidate answer pre-processor engine, a data driven machine learning operation on training natural language questions to learn strengths of relationships between entity types of entities in the training natural language questions and entities specified in correct answers to the training natural language questions; (2) selecting, by the proximity based candidate answer pre-processor engine, a set of entity types having strengths equal to or greater than a threshold strength as entity types for anchor entities; and (3) storing the selected set of entity types as an anchor entity configuration data structure in the proximity based candidate answer pre-processor engine. In this way, an automated learning is provided to allow the candidate answer pre-processor engine to learn those anchor entities that provide accurate results for answering input questions without the need for human intervention.

In some illustrative embodiments, the identifying operations for identifying the set of candidate answers and the sub-set of candidate answers are performed for each anchor entity in the sub-set of anchor entities. In these embodiments, outputting the sub-set of candidate answers to the QA system includes aggregating the sub-sets of candidate answers generated for each anchor entity to generate the final sub-set of candidate answers. This allows for the consideration of one or more anchor entities in a sub-set of anchor entities and the aggregation of the candidate answers such that a full set of candidate answers corresponding to all of the anchor entities in the sub-set of anchor entities may be evaluated.

In some illustrative embodiments, the predetermined proximity is a tunable proximity configuration parameter input to the proximity based candidate answer pre-processor engine and specifies a number of nodes away from the node corresponding to the entity. This allows for variability of the proximity configuration parameter.

In these illustrative embodiments, the proximity based candidate answer pre-processor engine operates with regard to a plurality of domains of input natural language questions, and there are different tunable proximity configuration parameters for at least two of the domains in the plurality of domains. This allows for the proximity configuration parameter to differ between domains according to the appropriate setting for the particular domain.

In some illustrative embodiments, the method further comprises: (1) performing, by the QA system, evidence based confidence scoring of each of the candidate answers in the final sub-set of candidate answers; (2) ranking, by the QA system, the candidate answers in the final sub-set of candidate answers based on confidence scores associated with the candidate answers; (3) selecting, by the QA system, a final candidate answer as an answer to the input natural language question based on the ranking of the candidate answers; and (4) outputting, by the QA system to an originator system that provided the input natural language question, the final candidate answer as the answer to the input natural language question. Thus, in these illustrative embodiments, answer generation may be focused in the QA system according to the final sub-set of candidate answers and avoids having to evaluate a large set of candidate answers generated without implementation of the proximity based candidate answer pre-processing mechanisms of the illustrative embodiments.

In these illustrative embodiments, the input natural language question comprises a plurality of entities and a confidence score weight value associated with candidate answers generated based on the entity is set according to a determined strength of the entity. In this way, different entities may have different strengths of association with correct candidate answers.

In these illustrative embodiments, the strength of the entity is determined based on an evaluation, during training of the proximity based candidate answer pre-processor engine using training natural language questions, of relationships between an entity type of the entity to entities specified in correct answers to the training natural language questions. Hence, more importance may be applied to candidate answers generated from evaluation of entities that have higher strengths as learned through a training operation.

In these illustrative embodiments, performing evidence based confidence scoring of each of the candidate answers comprises applying the confidence score weight value to confidence score calculations for the candidate answers. Moreover, in these illustrative embodiments, the QA system and the proximity based candidate answer pre-processor engine may be implemented on different data processing systems. This allows for a distributed manner of evaluating input questions such that the resources of multiple data processing systems may be utilized.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiments.

In yet other illustrative embodiments, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiments.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
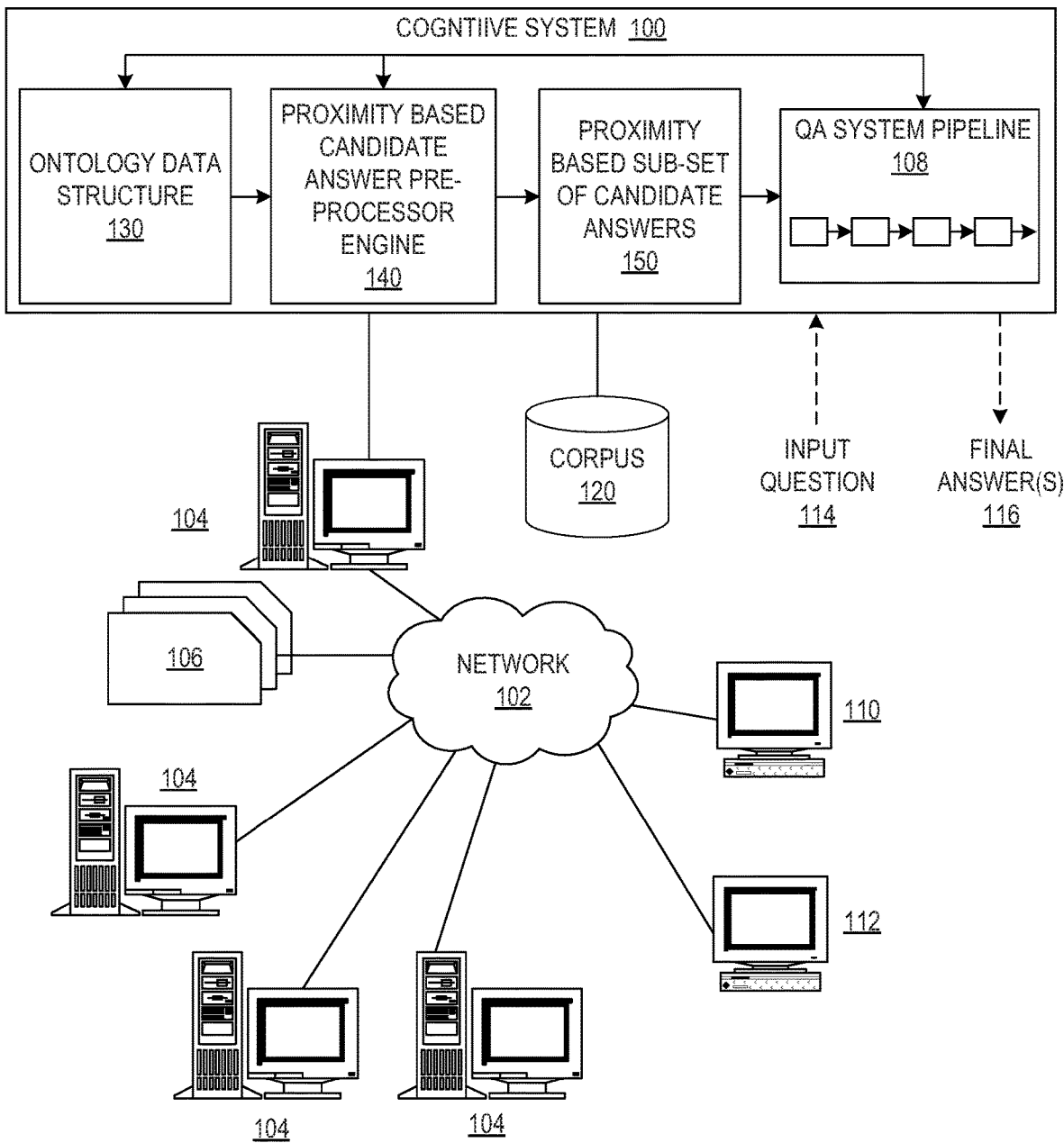
FIG. 1 depicts a schematic diagram of one illustrative embodiment of a cognitive system implemented in a computer network.

The illustrative embodiments provide mechanisms for performing lexical answer type (LAT) based answer generation using anchor entities and proximity evaluations. The illustrative embodiments recognize that current cognitive systems implementing question answering (QA) systems have some drawbacks in the way that they process input questions. For example, when a QA system processes an input question, one of the operations that may be performed is to identify the LAT of the input question and utilizing the LAT to retrieve candidate answers from an entire ingested corpus or corpora based on the LAT. This is useful when the set of candidate answers present in the entire ingested corpus or corpora that match the LAT is relatively small. However, the usefulness is diminished significantly where the set of candidate answers present in the entire ingested corpus or corpora is relatively large.

For example, assume that an input question of the type "What US President signed the Emancipation Proclamation?" is received as input to a cognitive system implementing a QA system. Parsing and analyzing the input question gives a LAT of "US President" since this is the type of answer being sought by the question. Since the number of US Presidents that can potentially be an answer to the input question is relatively small, generating instances of candidate answers for the LAT, evaluating the candidate answers based on evidence present in the corpus or corpora to generate confidence scores, and performing final merging and ranking of candidate answers for selection of a final answer is a reasonable approach that does not require an inordinate amount of resource utilization to achieve.

However, consider another question of the type "What actor played James T. Kirk in the television series Star Trek?" In this case, the LAT is "actor". However, in a corpus or corpora comprising a database of actors, there may be many tens of thousands of entities of the type "actor." For example, in the database system DBpedia, there are, at the time of the writing of this document, 62,317 entities of the type "actor." Performing detailed evidence analysis, candidate answer scoring, merging and ranking, etc. on all of these entities would require a significant amount of resource utilization.

As one solution for reducing the required amount of resource utilization required to generate answers to input questions using a cognitive system, the illustrative embodiments operate to process an input question to identify the LAT of the input question, other entities referenced in the input question that are utilized as anchor entities, and develops a relatively small sub-set of candidate answers that correspond to the LAT and also have close proximity (as may be specified by a proximity configuration parameter), with regard to an ontology of a corpus or corpora, to the anchor entities. The relatively small sub-set of candidate answers is a sub-set of candidate answers that is smaller than the set of candidate answers that would be identified based only on the LAT. This small sub-set of candidate answers is then used as a basis for performing evidence generation, confidence scoring, merging and ranking, and ultimate selection of a final answer.

In this way, the amount of resources expended on evaluating candidate answers is significantly reduced since the number of candidate answers being evaluated is significantly smaller than if all possible candidate answers from a large corpus or corpora of documents were evaluated. Such reduction in resource utilization is achieved while still obtaining good results since the smaller sub-set of candidate answers are specifically selected based on the LAT and the anchor entities in the input question, and a proximity parameter within an ontology that identifies candidate answers that are closely related to the anchor entities and have a type similar to that of the LAT. Through this pre-processing of potential candidate answers to generate a sub-set of candidate answers for further evaluation, the evaluation is focused on only those candidate answers that are most probable to be the best final answer for the input question.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
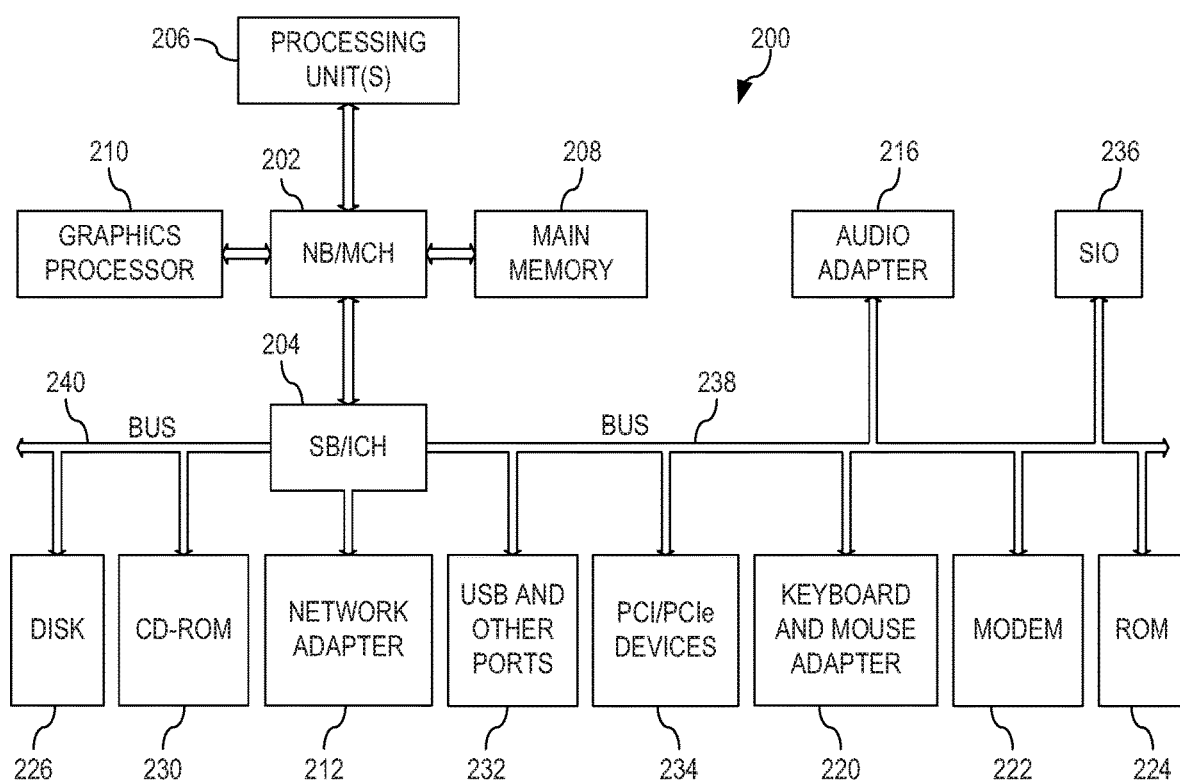
FIG. 2 is a block diagram of an example data processing system in which aspects of the illustrative embodiments are implemented.
Figure 3:
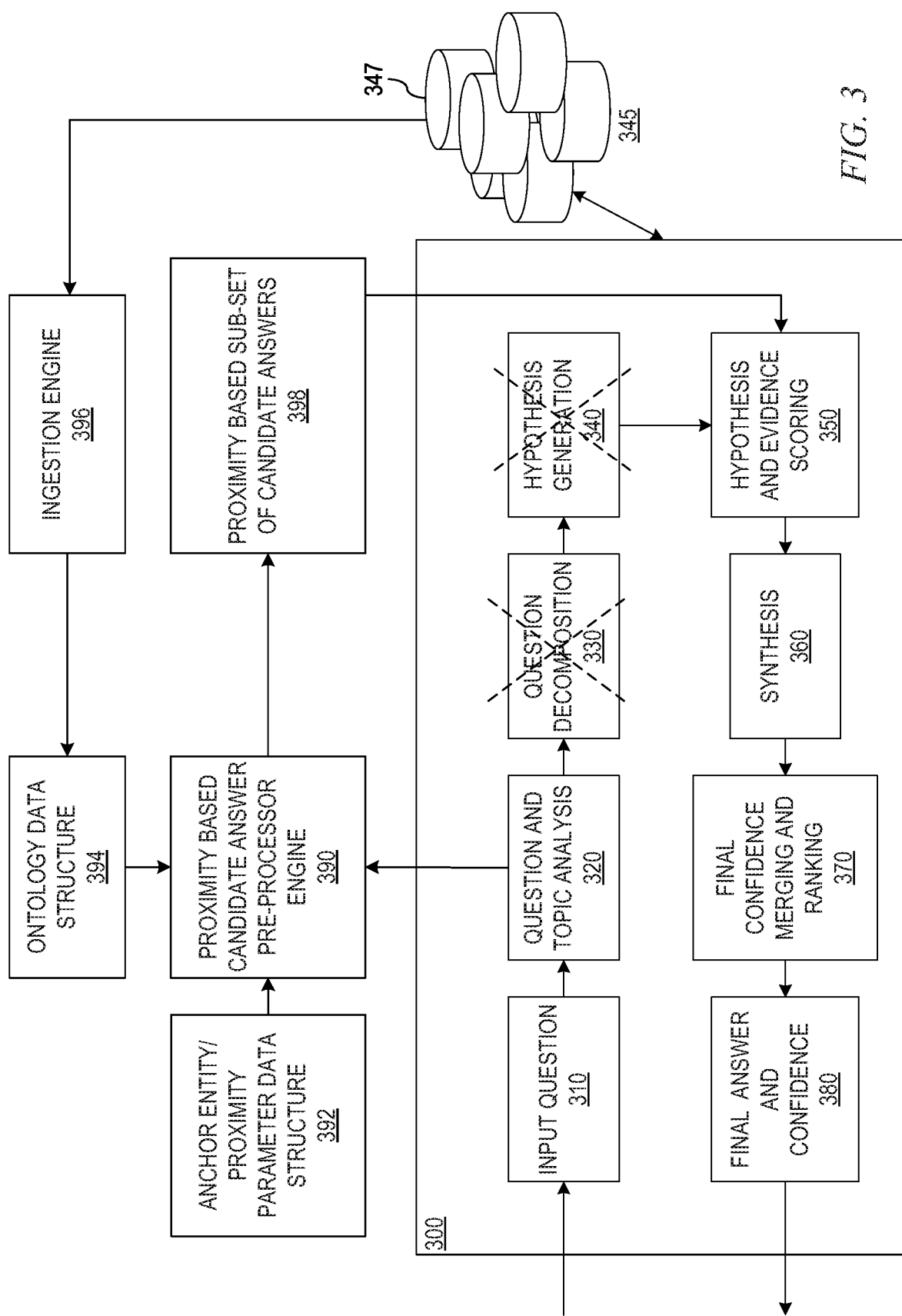
FIG. 3 illustrates an example QA system pipeline of a cognitive system for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. The QA pipeline is part of a QA system that may be implemented in the cognitive system. The cognitive system, while shown as having a single QA pipeline, may in fact have multiple QA pipelines. Each QA pipeline may be separately trained for answer input questions of a different domains or be configured to perform the same or different analysis on input questions, depending on the desired implementation. For example, in some cases, a first QA pipeline may be trained to operate on input questions in a financial domain while another QA pipeline may be trained to answer input questions in a medical diagnostics domain. Moreover, each QA pipeline may have their own associated corpus or corpora that they ingest and operate on, e.g., one corpus for financial domain documents and another corpus for medical diagnostics domain related documents in the above examples. In some cases, the QA pipelines may each operate on the same domain of input questions but may have different configurations, e.g., different annotators or differently trained annotators, such that different analysis and potential answers are generated. The QA system may provide additional logic for routing input questions to the appropriate QA pipeline, such as based on a determined domain of the input question, combining and evaluating final answers generated by multiple QA pipelines, and other control and interaction logic that facilitates the utilization of multiple QA pipelines.

As will be discussed in greater detail hereafter, the illustrative embodiments are integrated in, augment, and extend the functionality of these QA mechanisms of the cognitive system with regard to selecting a sub-set of candidate answers to perform full analysis and evaluation of by the various elements of the cognitive system's QA pipeline. This sort of pre-processing of the candidate answers is achieved by first analyzing the input question to identify the LAT and anchor entities specified in the input question. Based on the LAT, an ontology data structure, which may be represented as a graph with nodes (representing entities (e.g., person, place, thing) identified in natural language of a corpus or corpora) and edges connecting nodes (representing relationships between entities) of an ingested corpus or corpora is searched to identify nodes having a type that matches the LAT of the input question, where these identified nodes are considered to be candidate answer nodes for the input question.

This initial set of identified candidate answer nodes is then analyzed to identify those nodes that are within a specified proximity of one of the anchor entities specified in the input question. The proximity may be specified as a proximity configuration parameter input to the cognitive system and may be tunable, e.g., in some embodiments through a machine learning process, and/or user specified. The identification of candidate answer nodes that are within a specified proximity of an anchor entity may be performed on an anchor entity by anchor entity basis, e.g., a first sub-set for a first anchor entity and then a second sub-set for a second anchor entity, followed by combining the first and second sub-sets of candidate answer nodes to generate the final sub-set of candidate answer nodes used for evaluation purposes.

Alternatively, in other illustrative embodiments, rather than identifying the first set of candidate answers based on the LAT, the anchor entities may first be evaluated on an anchor entity by anchor entity basis to identify all nodes that are within the specified proximity of the anchor entity node in the ontology data structure. Then, for this set of nodes within the specified proximity, the types of these nodes is compared to the LAT to identify a sub-set of nodes that have a type matching or that is similar to the type specified by the LAT. This sub-set of nodes is then used as the sub-set of candidate answer nodes for that particular anchor entity. Sub-sets of candidate answers nodes for each of the anchor entities may then be combined to generate the sub-set of candidate answer nodes that are used for further evaluation purposes by the QA pipeline.

It is clear from the above that the illustrative embodiments improve the operation of a cognitive system implementing a QA system having one or more QA pipelines. Thus, in order to best understand the operation of these improvements, it is important to first have an understanding of how question analysis and final answer generation in a cognitive system implementing a QA pipeline is performed before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system.

For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a proximity based candidate answer pre-processor engine 140. As shown in FIG. 1, the proximity based candidate answer pre-processor engine 140 operates on an input question 114 submitted to the cognitive system 100, such as via a client computing device 110, network 102, and server 104, by parsing and analyzing the input question 114 to identify the lexical answer type (LAT) of the input question 114 and anchor entities specified in the input question 114. As noted above, an entity may be any person, place, or thing specified in the input question. Thus, for example, in the input question "What actor played James T. Kirk in the television series Star Trek?" the LAT is "actor" and the entities are "James T. Kirk", "television", and "Star Trek". In some illustrative embodiments, all entities specified in an input question may be considered anchor entities. In other illustrative embodiments, as described hereafter, filtering of entities may be performed to select only a sub-set of specified entities to be anchor entities.

The parsing and analysis may be performed by the proximity based candidate answer pre-processor engine 140 itself. Alternatively, the proximity based candidate answer pre-processor engine 140 may utilize other tools and logic provided by the QA system pipeline 108 which operate to parse and analyze the input question in a manner generally performed by the QA system pipeline 108 as described above and hereafter with regard to FIG. 3. Such parsing and analysis performed by the QA system pipeline 108 identifies the LAT of the question and entities in the input question 114. In such an embodiment, all of the entities specified in the input question will be considered anchor entities unless the QA system pipeline 108 is configured to implement logic as discussed above for differentiating between entities and actual anchor entities.

In some illustrative embodiments, after identifying the entities specified in the input question 114 through parsing and initial analysis, the entities are further evaluated to select anchor entities. Anchor entities are those entities that have been determined to be most indicative of the correct candidate answers to input questions. That is, different types of entities have different strengths of connection to the entities included in the final answer to an input question. For example, entities of the type "person" tend to be more strongly related to entities in answers to input questions requesting the identity of a person than entities of the type "entity" which has a relatively weak connection to the entities in the final answers in such input questions, i.e. there are many "entities" that are not persons and thus the overall strength of "entity" with the identity of a person is relatively low. A data-driven approach over training questions may be utilized to identify which types of entities have strong connections to the entities indicated in final answers to the training questions and thus, may be used as anchor entities. These selected types of entities for use as anchor entities may then be stored in an anchor entity configuration data structure of the proximity based candidate answer pre-processor engine 140 for use in filtering entities of an input question to select anchor entities.

Alternatively, in some illustrative embodiments, all entity types may be evaluated and relative strengths determined with these relative strengths being stored in the anchor entity configuration data structure such that the relative strengths may be used as weighting factors for weighting the confidence scores calculated for candidate answers. In such cases, again, all entities of an input question would be considered anchor entities, but each entity would have its own relative strength value applied to confidence scores of candidate answers generated based on that anchor entity.

With regard to generating strength scores for entities for selection of anchor entities or applying strength weights to confidence scores of candidate answers, in some illustrative embodiments the strength of an entity may be evaluated based on a training set of questions and answers (QA set) in the following manner. For all questions Q containing an entity E of type T in the QA set, let A be the total number of answers in QA for the question Q and let C be the number of answers in QA within n steps of E, where n is a small number (e.g., less than 4) and a "step" is an edge in a graph representation of the ontology in the ontology data structure. The strength score S for type T of entity E is calculated as S=C/A, i.e. the ratio of the number of answers across all questions Q that are within n steps of the entity E to the total number of answers across all questions Q. In embodiments where this strength score S is used to filter entities specified in an input question to select anchor entities, a threshold strength score may be defined for determining which types of entities have sufficiently high enough strength scores to warrant selection as an anchor entity, e.g., a threshold of 30% or greater.

Thus, types of entities that meet or exceed the threshold strength score may be maintained in an anchor entity configuration data structure for use in filtering entities specified in an input question. That is, for each entity specified in the input question, the type of that entity may be compared to the types included in the anchor entity configuration data structure and if there is a match, then the corresponding entity in the input question is selected as an anchor entity. Alternatively, as noted above, all entities of all types may be selected as anchor entities and their corresponding strength scores may be used as weighting factors when calculated confidence scores for the candidate answers generated based on the particular entity.

It should be appreciated that the above example for calculating a strength score for an entity type is only one example. Many modifications to this example may be made within the scope of this disclosure. Essentially, any suitable calculation for evaluating the relative importance of an entity type to the determination of an answer to an input question may be used without departing from the spirit and scope of the present invention. Moreover, it should be appreciated that these strength scores may be determined for specific domains such that different strength scores may be calculated for the same entity type in different domains, e.g., the strength score S1 for entity type T (e.g., person name) for a first domain D1 (e.g., a financial domain) may be different than the strength score S2 for the same entity type T in a second domain D2 (e.g., medical diagnosis). The particular calculations performed for calculating the strength score may likewise be different depending on the domain and the desired implementation.

Having identified the LAT and at least one anchor entity in the input question 114, the proximity based candidate answer pre-processor engine 140 identifies in the ontology data structure 130 stored in a corresponding storage device (e.g., a memory, hard disk, or the like), other entities that are within a predetermined proximity to the anchor entity in the ontology. The ontology data structure 130 is generated by ingesting the corpus 120 which involves performing annotation operations, natural language processing operations, and the like, on the natural language content of the corpus 120 to identify specified entities and their relationships with one another. The ontology data structure 130 may be provided as a nodal graph in which nodes represent entities and edges between nodes represent relationships between entities, where edges may have edge strength characteristics representing the strength of a relationship between the entities. The generation of an ontology data structure 130 from a corpus 120 is generally known in the art and thus, a more detailed explanation is not provided herein.

The predetermined proximity may be specified as a configuration parameter in the proximity based candidate answer pre-processor engine 140 and may be tunable through an automated machine learning process and/or manually set. Moreover, there may be different proximity parameters specified for different domains and/or different entity types. In a case where there are different proximity parameters for different entity types, depending on the entity type of the anchor entity, the corresponding proximity parameter may be retrieved by the proximity based candidate answer pre-processor engine 140 and utilized to identify other entities in the ontology data structure 130.

That is, a node in the ontology data structure 130 corresponding to the anchor entity is identified. The nodes of the ontology data structure 130 comprise various characteristics about the entity with which the node corresponds. One of these characteristics is an entity type and a node may have multiple entity types with which it corresponds. For example, a name such as "James T. Kirk" may have an entity type of "person," "person name," and/or the like. The entity types may be compared to the type specified by the lexical answer type (LAT) of the input question 114 as discussed hereafter. Thus, for example, in the input question "What actor played James T. Kirk in the television series Star Trek?" an anchor entity of "James T. Kirk" may be utilized and a corresponding node found in the ontology data structure 130.

Having identified a node in the ontology data structure 130 corresponding to the anchor entity, the proximity based candidate answer pre-processor engine 140 then identifies all of the other nodes connected by edges to the selected anchor entity node in the ontology data structure 130 which are within a predetermined proximity of the anchor entity node. As mentioned above, this predetermined proximity may be based on the entity type of the anchor entity node in some embodiments, e.g., the entity type of "James T. Kirk"

is a "person" and for "person" entity types, a proximity of less than 4 steps (or edges) away from the anchor entity node is utilized. For simplicity of the present description, it will be assumed that the same proximity is used for all entity types.

The entity types of the other nodes that are within the proximity of the anchor entity node are compared to the entity type of the LAT. Those that match, or are determined to be similar or equivalent to the entity type of the LAT, are identified and maintained as a sub-set of candidate answer nodes for the particular anchor entity. For example, in the running question example above, candidate answer nodes that are within proximity to "James T. Kirk" may include entities such as <William_Shatner>, <Leonard_Nimoy>, <Deforest_Kelly>, <Chris_Pine>, <USS_Enterprise>, <captain>, <spaceship>, etc. The entity types of these candidate answer nodes may be compared to the LAT's entity type of "actor" to identify a sub-set of candidate answer nodes that match, are equivalent, or are similar to the entity type of the LAT, e.g., in this case the candidate answer nodes corresponding to <William_Shatner>, <Leonard_Nimoy>, <Deforest_Kelly>, and <Chris_Pine> would be selected. With regard to equivalence or similarity, equivalence or similarity data structures may be utilized by the proximity based candidate answer pre-processor engine 140 to correlate entity types that are determined to be equivalent or similar, e.g., entity type "person" is similar to an entity type of "people" or "human being".

This process may be repeated for each anchor entity in the input question 114, e.g., "television" and "Star Trek" in the running example. The proximity based candidate answer pre-processor engine 140 may then combine the various sub-sets of nodes, i.e. the nodes that are within the proximity of the various anchor entity nodes that have a same, equivalent, or similar entity type to that of the LAT, to generate a proximity based sub-set of candidate answers data structure 150 that is provided to the QA system pipeline 108 as input to the candidate answer generation or hypothesis generation logic of the QA system pipeline 108. The QA system pipeline 108 then performs its normal operations for evaluating this sub-set of candidate answers with regard to evidence in the corpus 120, performing confidence scoring and merging of candidate answers, ranking of candidate answers, and final answer selection. The QA system pipeline 108 then returns the selected final answer 116 to the source of the original input question 114, e.g., client computing device 110. It should be appreciated that in some embodiments the final answer 116 may in actuality comprise a plurality of ranked answers and may include corresponding evidence passages that were found to support the candidate answer as being a correct answer or otherwise justify the confidence score associated with the answer.

Thus, it can be seen that through the mechanisms of the illustrative embodiments, a sub-set of candidate answers is identified based on close proximity to anchor entities found in the input question 114 and entity types matching or similar to the lexical answer type. This sub-set of candidate answers, which is a more focused and smaller set than would otherwise be generated by evaluation of the entire ontology, is then evaluated using the QA system pipeline 108 logic. This greatly reduces the resource utilization of the QA system pipeline 108 while maintaining a high degree of confidence in the final answers 116 that are generated.

It should be appreciated that while the embodiments described above with regard to FIG. 1 utilize a process by which proximity based candidate answers are selected by looking at nodes within a proximity of the anchor nodes first and then comparing the entity types of those nodes to the entity type of the LAT, the illustrative embodiments are not limited to such. Rather, in other illustrative embodiments, all nodes in the ontology data structure 130 that have an entity type matching that of the LAT may first be selected and thereafter, sub-sets of candidate answers may be identified by identifying which of those nodes are within the predetermined proximity of an anchor entity node. In either embodiment, the result should be the same, i.e. a sub-set of candidate answers that are based on a correspondence of entity type with the LAT and a proximity to other anchor entities specified within the input question 114. Of course other implementations may take a modified approach to generating the sub-set of candidate answers and any implementation where a sub-set of candidate answers is selected based on both a correspondence of entity type with the LAT and proximity to other anchor entities in the input question may be used without departing from the spirit and scope of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, the QA system pipeline 300 is further augmented to work in conjunction with a proximity based candidate answer pre-processor engine 390. As described previously, the proximity based candidate answer pre-processor engine 390 may receive the features of the input question 310 obtained by the question and topic analysis logic 320, which may include the LAT and specified entities in the input question 310. In addition, the proximity based candidate answer pre-processor engine 390 receives as input the ontology data structure 394 generated by the ingestion engine 396 when ingesting the corpora 345 or corpus 347. As discussed previously, the ontology data structure 394 represents the information in the content of the corpus/corpora 345, 347 as nodes representing entities and edges representing relationships between entities. The proximity based candidate answer pre-processor engine 390 operates as previously described in accordance with one or more of the above described illustrative embodiments to identify candidate answer nodes in the ontology data structure 394 that are within a predetermined proximity of anchor entity nodes, corresponding to anchor entities identified in the input question 310, and which have a same, equivalent, or similar entity type to that of the LAT of the input question 310. This identification may be done for each of the anchor entities identified in the input question 310 and combined to generate a proximity based sub-set of candidate answers 398.

The proximity based sub-set of candidate answers 398 is input as the set of hypotheses or candidate answers that are further evaluated by the hypothesis and evidence scoring logic 350 for evaluation with regard to evidence supporting/refuting the candidate answer as a correct answer to the input question and generating a confidence score based on the evidential support evaluation. As can be seen in FIG. 3, this input of the proximity based sub-set of candidate answers 398 essentially bypasses the question decomposition logic 330 and hypothesis generation logic 340 of the pipeline 300 thereby saving resource usage. Moreover, since the hypothesis and evidence scoring logic 350 operates on a significantly reduced size set of candidate answers, the amount of resources (in terms of processor cycles, communication bandwidth, memory utilization, etc.) is significantly reduced. This propagates to other logic downstream which operates on a smaller set of candidate answers and corresponding evidence passages and confidence score information. The logic 350-380 operates as previously described above but on the smaller sized proximity based sub-set of candidate answers 398. Thus, the pre-processing of potential candidate answers to generate a sub-set of candidate answers 398 for further evaluation focuses the processing of the logic 350-380 on only those candidate answers that are most probable to be the best final answer for the input question 310.

Figure 4:
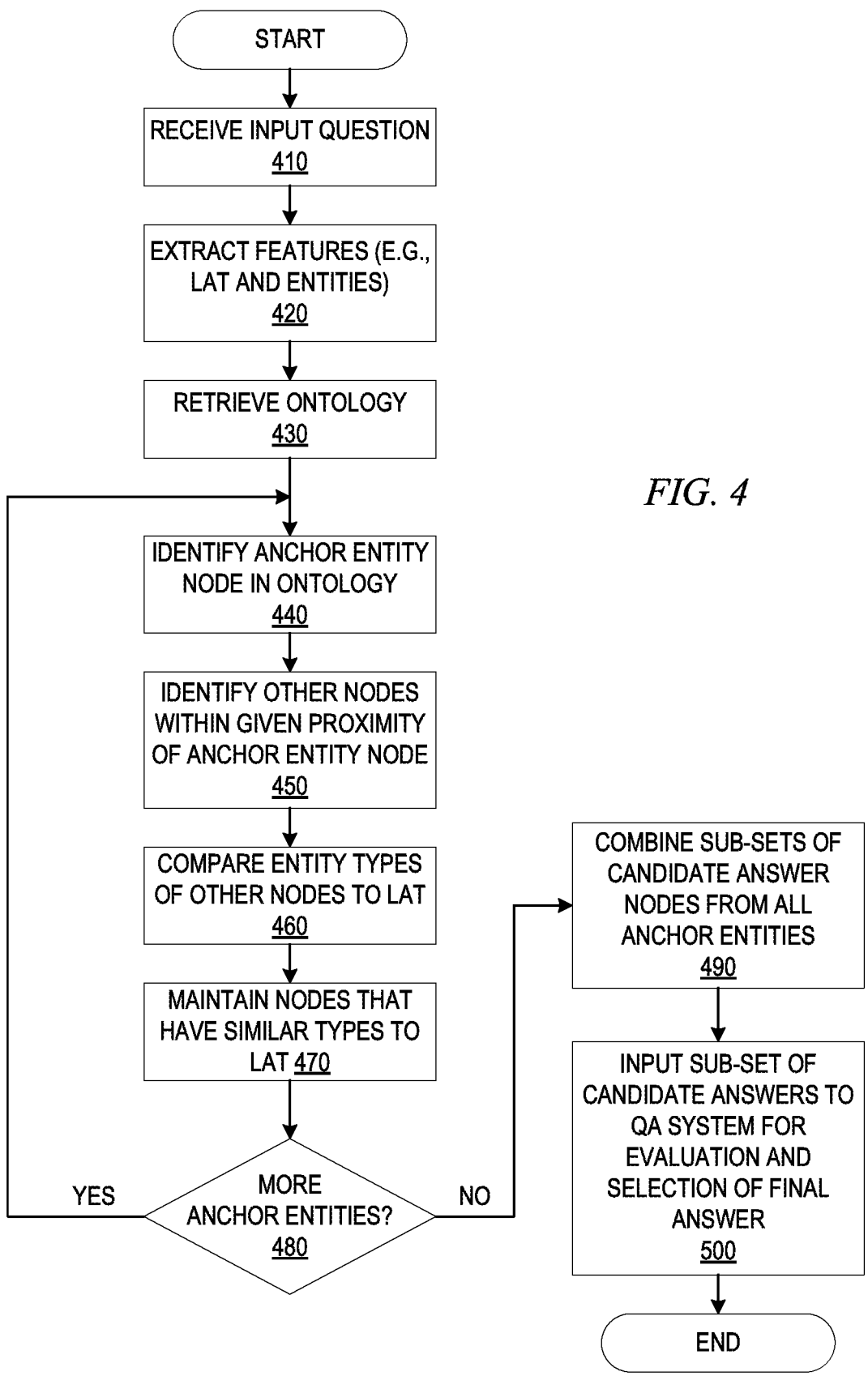
FIG. 4 is a flowchart outlining an example operation for selecting a sub-set of candidate answers and processing the sub-set of candidate answers to generate a final answer for an input question in accordance with one illustrative embodiment.

FIG. 4 is a flowchart outlining an example operation for selecting a sub-set of candidate answers and processing the sub-set of candidate answers to generate a final answer for an input question in accordance with one illustrative embodiment. As shown in FIG. 4, the operation starts by receiving an input natural language question (step 410) which is analyzed to extract features including the lexical answer type (LAT) and one or more anchor entities specified in the input question (step 420). As noted above, depending upon the particular embodiment, the anchor entities may be all of the entities specified in the input question or may be a filtered set of entities corresponding to entity types determined to be sufficient to serve as anchor entities.

An ontology data structure for the corpus or corpora is retrieved (step 430). For a next anchor entity identified in the input question, a node in the ontology data structure corresponding to the anchor entity is identified (step 440) and other nodes corresponding to other entities that are within a predefined proximity of the anchor entity node in the ontology are identified (step 450). The entity types of the other nodes within proximity of the anchor entity node are compared to the entity type of the LAT of the input question to identify those that have matching, equivalent, or similar entity types (step 460). Those nodes that match, are equivalent, or have similar entity types are maintained as a sub-set of candidate answer nodes for the particular anchor entity (step 470).

If there are additional anchor entities to process (step 480), the operation returns to step 440. If there are no additional anchor entities, then the sub-sets of candidate answer nodes of all of the anchor entities are combined (step 490) and input to the QA system pipeline for further evidential support evaluation, confidence score calculation, synthesis, merging and ranking, and selection of a final answer to the input question (step 500). The operation then terminates.

In view of the above, it can be appreciated that, in accordance with one illustrative embodiment, a method is provided, in a data processing system comprising at least one processor and at least one memory, wherein the at least one memory comprises instructions that are executed by the at least one processor to configure the data processing system to implement a proximity based candidate answer pre-processor engine that outputs a sub-set of candidate answers to a question and answer (QA) system. The method comprises receiving, by the proximity based candidate answer pre-processor engine of the data processing system, a lexical answer type (LAT) and an entity specified in an input natural language question. The method also comprises receiving, by the proximity based candidate answer pre-processor engine, an ontology data structure representing a corpus of natural language content. In addition, the method comprises identifying, by the proximity based candidate answer pre-processor engine, a set of candidate answers having associated nodes in the ontology data structure that are within a predetermined proximity of a node corresponding to the entity. Furthermore, the method comprises identifying, by the proximity based candidate answer pre-processor engine, a sub-set of candidate answers in the set of candidate answers having an entity type corresponding to the LAT. Moreover, the method comprises outputting, by the proximity based candidate answer pre-processor engine, to the QA system, the sub-set of candidate answers as candidate answers to the input natural language question for evaluation and selection of a final answer to the input natural language question. As a result, the illustrative embodiment reduces the time and resources required to evaluate an input question by focusing candidate answer evaluation to a sub-set of candidate answers that have nodes in an ontology that are within a proximity of a node corresponding to an entity in the input question, which is indicative of a close relationship with the entity in the input question.

In some illustrative embodiments, the input natural language question comprises a plurality of entities and the entity specified in the input natural language question is part of a sub-set of anchor entities in the plurality of entities. Anchor entities are entities having an entity type that has been previously identified to provide accurate results in generating candidate answers for input natural language questions. Such mechanisms provide improved accuracy by utilizing entities found to provide good results when processing input questions or other natural language text.

In some illustrative embodiments, the entity types associated with anchor entities are specified in a configuration data structure of the proximity based candidate answer pre-processor engine, and the entity types of anchor entities are specified either manually by a user or are automatically identified based on a machine learning process. In this way, the mechanisms of the illustrative embodiments are configured to implement anchor entities that have been previously identified by a user to generate accurate results for answering input questions or processing natural language text or which have been previously identified by an automated mechanism as generating accurate results.

In some illustrative embodiments, the entity types associated with anchor entities are specified in a configuration data structure of the proximity based candidate answer pre-processor engine, and the method further comprises: (1) performing, by the proximity based candidate answer pre-processor engine, a data driven machine learning operation on training natural language questions to learn strengths of relationships between entity types of entities in the training natural language questions and entities specified in correct answers to the training natural language questions; (2) selecting, by the proximity based candidate answer pre-processor engine, a set of entity types having strengths equal to or greater than a threshold strength as entity types for anchor entities; and (3) storing the selected set of entity types as an anchor entity configuration data structure in the proximity based candidate answer pre-processor engine. In this way, an automated learning is provided to allow the candidate answer pre-processor engine to learn those anchor entities that provide accurate results for answering input questions without the need for human intervention.

In some illustrative embodiments, the identifying operations for identifying the set of candidate answers and the sub-set of candidate answers are performed for each anchor entity in the sub-set of anchor entities. In these embodiments, outputting the sub-set of candidate answers to the QA system includes aggregating the sub-sets of candidate answers generated for each anchor entity to generate the final sub-set of candidate answers. This allows for the consideration of one or more anchor entities in a sub-set of anchor entities and the aggregation of the candidate answers such that a full set of candidate answers corresponding to all of the anchor entities in the sub-set of anchor entities may be evaluated.

In some illustrative embodiments, the predetermined proximity is a tunable proximity configuration parameter input to the proximity based candidate answer pre-processor engine and specifies a number of nodes away from the node corresponding to the entity. This allows for variability of the proximity configuration parameter.

In these illustrative embodiments, the proximity based candidate answer pre-processor engine operates with regard to a plurality of domains of input natural language questions, and there are different tunable proximity configuration parameters for at least two of the domains in the plurality of domains. This allows for the proximity configuration parameter to differ between domains according to the appropriate setting for the particular domain.

In some illustrative embodiments, the method further comprises: (1) performing, by the QA system, evidence based confidence scoring of each of the candidate answers in the final sub-set of candidate answers; (2) ranking, by the QA system, the candidate answers in the final sub-set of candidate answers based on confidence scores associated with the candidate answers; (3) selecting, by the QA system, a final candidate answer as an answer to the input natural language question based on the ranking of the candidate answers; and (4) outputting, by the QA system to an originator system that provided the input natural language question, the final candidate answer as the answer to the input natural language question. Thus, in these illustrative embodiments, answer generation may be focused in the QA system according to the final sub-set of candidate answers and avoids having to evaluate a large set of candidate answers generated without implementation of the proximity based candidate answer pre-processing mechanisms of the illustrative embodiments.

In these illustrative embodiments, the input natural language question comprises a plurality of entities and a confidence score weight value associated with candidate answers generated based on the entity is set according to a determined strength of the entity. In this way, different entities may have different strengths of association with correct candidate answers.

In these illustrative embodiments, the strength of the entity is determined based on an evaluation, during training of the proximity based candidate answer pre-processor engine using training natural language questions, of relationships between an entity type of the entity to entities specified in correct answers to the training natural language questions. Hence, more importance may be applied to candidate answers generated from evaluation of entities that have higher strengths as learned through a training operation.

In these illustrative embodiments, performing evidence based confidence scoring of each of the candidate answers comprises applying the confidence score weight value to confidence score calculations for the candidate answers. Moreover, in these illustrative embodiments, the QA system and the proximity based candidate answer pre-processor engine may be implemented on different data processing systems. This allows for a distributed manner of evaluating input questions such that the resources of multiple data processing systems may be utilized.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiments.

In yet other illustrative embodiments, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiments.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to configure the data processing system to implement a proximity based candidate answer pre-processor engine that outputs a sub-set of candidate answers to a question and answer (QA) system, the method comprising:
    receiving, by the proximity based candidate answer pre-processor engine of the data processing system, a lexical answer type (LAT) and an entity specified in an input natural language question;
    receiving, by the proximity based candidate answer pre-processor engine, an ontology data structure representing a corpus of natural language content, wherein the ontology data structure comprises a graph of nodes representing entities and edges connecting nodes, where the edges represent relationships between connected entities;
    identifying, by the proximity based candidate answer pre-processor engine, a set of candidate answers having associated nodes in the ontology data structure that are within a predetermined proximity of a node corresponding to the entity;
    identifying, by the proximity based candidate answer pre-processor engine, a sub-set of candidate answers in the set of candidate answers having an entity type corresponding to the LAT; and
    outputting, by the proximity based candidate answer pre-processor engine, to the QA system, the sub-set of candidate answers as a final sub-set of candidate answers to the input natural language question for evaluation and selection of a final answer to the input natural language question, wherein the predetermined proximity is a tunable proximity configuration parameter input to the proximity based candidate answer pre-processor engine and specifies a number of nodes away from the node corresponding to the entity.

2. The method of claim 1, wherein the input natural language question comprises a plurality of entities and wherein the entity specified in the input natural language question is part of a sub-set of anchor entities in the plurality of entities, and wherein anchor entities are entities having an entity type that has been previously identified to provide accurate results in generating candidate answers for input natural language questions.

3. The method of claim 2, wherein the entity types associated with anchor entities are specified in a configuration data structure of the proximity based candidate answer pre-processor engine, and wherein the entity types of anchor entities are specified either manually by a user or are automatically identified based on a machine learning process.

4. The method of claim 2, wherein the entity types associated with anchor entities are specified in a configuration data structure of the proximity based candidate answer pre-processor engine, and wherein the method further comprises:
    performing, by the proximity based candidate answer pre-processor engine, a data driven machine learning operation on training natural language questions to learn strengths of relationships between entity types of entities in the training natural language questions and entities specified in correct answers to the training natural language questions;
    selecting, by the proximity based candidate answer pre-processor engine, a set of entity types having strengths equal to or greater than a threshold strength as entity types for anchor entities; and
    storing the selected set of entity types as an anchor entity configuration data structure in the proximity based candidate answer pre-processor engine.

5. The method of claim 2, wherein the identifying operations are performed for each anchor entity in the sub-set of anchor entities, and wherein outputting the sub-set of candidate answers to the QA system comprises aggregating the sub-sets of candidate answers generated for each anchor entity to generate the final sub-set of candidate answers.

6. The method of claim 1, wherein the proximity based candidate answer pre-processor engine operates with regard to a plurality of domains of input natural language questions, and wherein there are different tunable proximity configuration parameters for at least two of the domains in the plurality of domains.

7. The method of claim 1, further comprising:
    performing, by the QA system, evidence based confidence scoring of each of the candidate answers in the final sub-set of candidate answers;
    ranking, by the QA system, the candidate answers in the final sub-set of candidate answers based on confidence scores associated with the candidate answers;
    selecting, by the QA system, a final candidate answer as an answer to the input natural language question based on the ranking of the candidate answers; and
    outputting, by the QA system to an originator system that provided the input natural language question, the final candidate answer as the answer to the input natural language question.

8. The method of claim 7, wherein:
    the input natural language question comprises a plurality of entities and wherein a confidence score weight value associated with candidate answers generated based on the entity is set according to a determined strength of the entity, the strength of the entity is determined based on an evaluation, during training of the proximity based candidate answer pre-processor engine using training natural language questions, of relationships between an entity type of the entity to entities specified in correct answers to the training natural language questions, and performing evidence based confidence scoring of each of the candidate answers comprises applying the confidence score weight value to confidence score calculations for the candidate answers.

9. The method of claim 7, wherein the QA system and the proximity based candidate answer pre-processor engine are implemented on different data processing systems.

10. A computer program product comprising a computer readable storage medium having a computer readable program stored therein, wherein the computer readable program, when executed on a computing device, causes the computing device to implement a proximity based candidate answer pre-processor engine that outputs a sub-set of candidate answers to a question and answer (QA) system at least by:

receiving a lexical answer type (LAT) and an entity specified in an input natural language question;

receiving an ontology data structure representing a corpus of natural language content, wherein the ontology data structure comprises a graph of nodes representing entities and edges connecting nodes, where the edges represent relationships between connected entities;

identifying a set of candidate answers having associated nodes in the ontology data structure that are within a predetermined proximity of a node corresponding to the entity;

identifying a sub-set of candidate answers in the set of candidate answers having an entity type corresponding to the LAT; and outputting, to the QA system, the sub-set of candidate answers as a final sub-set of candidate answers to the input natural language question for evaluation and selection of a final answer to the input natural language question, wherein the predetermined proximity is a tunable proximity configuration parameter input to the proximity based candidate answer pre-processor engine and specifies a number of nodes away from the node corresponding to the entity.

11. The computer program product of claim 10, wherein the input natural language question comprises a plurality of entities and wherein the entity specified in the input natural language question is part of a sub-set of anchor entities in the plurality of entities, and wherein anchor entities are entities having an entity type that has been previously identified to provide accurate results in generating candidate answers for input natural language questions.

12. The computer program product of claim 11, wherein the entity types associated with anchor entities are specified in a configuration data structure of the proximity based candidate answer pre-processor engine, and wherein the entity types of anchor entities are specified either manually by a user or are automatically identified based on a machine learning process.

13. The computer program product of claim 11, wherein the entity types associated with anchor entities are specified in a configuration data structure of the proximity based candidate answer pre-processor engine, and wherein the computer readable program further causes the proximity based candidate answer pre-processor engine to output the sub-set of candidate answers to the QA system at least by:

performing a data driven machine learning operation on training natural language questions to learn strengths of relationships between entity types of entities in the training natural language questions and entities specified in correct answers to the training natural language questions;

selecting a set of entity types having strengths equal to or greater than a threshold strength as entity types for anchor entities; and storing the selected set of entity types as an anchor entity configuration data structure in the proximity based candidate answer pre-processor engine.

14. The computer program product of claim 11, wherein the identifying operations are performed for each anchor entity in the sub-set of anchor entities, and wherein outputting the sub-set of candidate answers to the QA system comprises aggregating the sub-sets of candidate answers generated for each anchor entity to generate the final sub-set of candidate answers.

15. The computer program product of claim 10, wherein the proximity based candidate answer pre-processor engine operates with regard to a plurality of domains of input natural language questions, and wherein there are different tunable proximity configuration parameters for at least two of the domains in the plurality of domains.

16. The computer program product of claim 10, wherein the computer readable program further causes the computing device to:

perform, by the QA system, evidence based confidence scoring of each of the candidate answers in the final sub-set of candidate answers;

rank, by the QA system, the candidate answers in the final sub-set of candidate answers based on confidence scores associated with the candidate answers;

select, by the QA system, a final candidate answer as an answer to the input natural language question based on the ranking of the candidate answers; and output, by the QA system to an originator system that provided the input natural language question, the final candidate answer as the answer to the input natural language question.

17. The computer program product of claim 16, wherein:

the input natural language question comprises a plurality of entities and wherein a confidence score weight value associated with candidate answers generated based on the entity is set according to a determined strength of the entity, the strength of the entity is determined based on an evaluation, during training of the proximity based candidate answer pre-processor engine using training natural language questions, of relationships between an entity type of the entity to entities specified in correct answers to the training natural language questions, and performing evidence based confidence scoring of each of the candidate answers comprises applying the confidence score weight value to confidence score calculations for the candidate answers.

18. An apparatus comprising:

a processor; and a memory coupled to the processor, wherein the memory comprises instructions which, when executed by the processor, cause the processor to implement a proximity based candidate answer pre-processor engine that outputs a sub-set of candidate answers to a question and answer (QA) system at least by:

receiving a lexical answer type (LAT) and an entity specified in an input natural language question;

receiving an ontology data structure representing a corpus of natural language content, wherein the ontology data structure comprises a graph of nodes representing entities and edges connecting nodes, where the edges represent relationships between connected entities;

identifying a set of candidate answers having associated nodes in the ontology data structure that are within a predetermined proximity of a node corresponding to the entity;

identifying a sub-set of candidate answers in the set of candidate answers having an entity type corresponding to the LAT; and outputting, to the QA system, the sub-set of candidate answers as a final sub-set of candidate answers to the input natural language question for evaluation and selection of a final answer to the input natural language question, wherein the predetermined proximity is a tunable proximity configuration parameter input to the proximity based candidate answer pre-processor engine and specifies a number of nodes away from the node corresponding to the entity.

\* \* \* \* \*